April 9, 1929.  O. WITTEL  1,708,372
MOTION PICTURE FILM GUIDEWAY
Filed Jan. 22, 1927
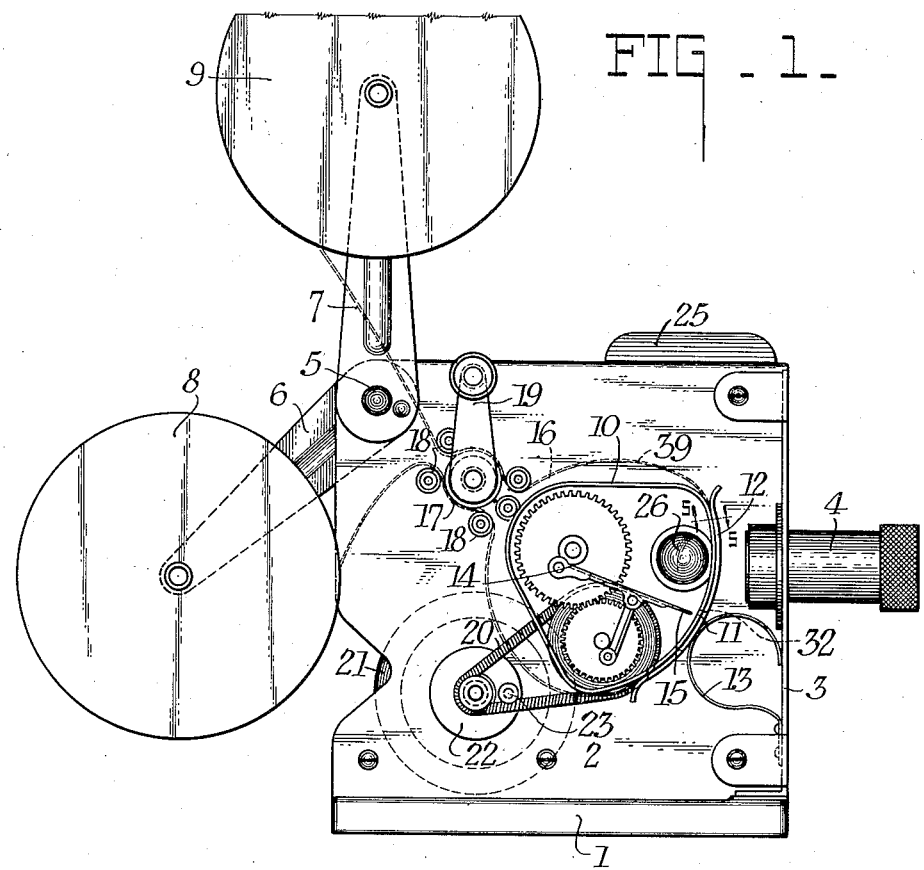
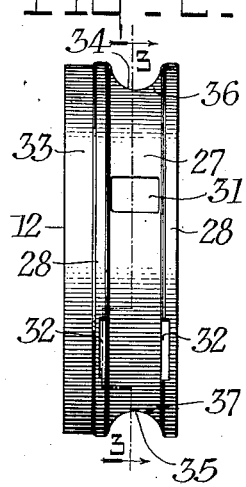
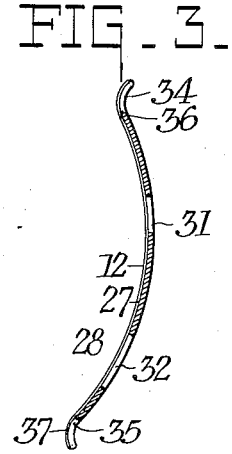
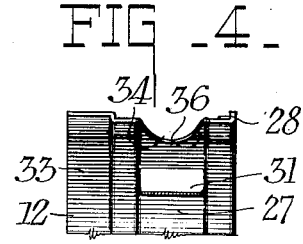
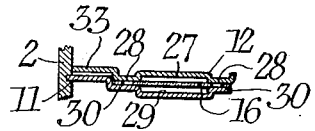
INVENTOR,
Otto Wittel,
BY
ATTORNEYS.

Patented Apr. 9, 1929.

1,708,372

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

MOTION-PICTURE-FILM GUIDEWAY.

Application filed January 22, 1927. Serial No. 162,762.

This invention relates to motion picture film guides of the type to be found in apparatus through which motion picture film may be passed for purposes of photographic exposure or for projection. One of the principal causes of deterioration in the usefulness of motion picture film is the accumulation of scratches on the surface, rendering the projected image unsatisfactory. I have discovered that in a type of machine in which one presser member holds the film resiliently against another cooperating member, the accumulation of scratches may be greatly reduced by the proper formation of such a guide member.

A complete understanding of my invention, its objects and advantages may be obtained from the following specification wherein reference is made to the accompanying drawing, in which Fig. 1 is a side elevation of a projector embodying my improved guideway, Fig. 2 is a front view of my improved removable presser member, Fig. 3 is a section taken on the line 3—3 of Fig. 2, Fig. 4 is a fragmentary view of a portion of the presser member taken from above and at an angle, and Fig. 5 is a section taken on the line 5—5 of Fig. 1.

The projector in which my improved guideway is shown as embodied, consists of the base 1 upon which is a longitudinal partition 2, from the front of which extends the supporting frame 3 carrying an objective mount 4. Hinged to the partition at 5 are arms 6 and 7 carrying the reels 8 and 9 respectively. On one side of the partition is mounted the housing 10, the front part of which is curved at 11 and forms one member of the guideway. Cooperating with the member 11 is a similarly curved presser member 12 resiliently held against the member 11 by a spring 13 attached to the frame 3. Within the casing 10 is a film advancing mechanism designated as a whole as 14 and including a claw 15 having a path of movement through suitable slots in the guide members and by which the film is advanced through the guideway. The film 16 is drawn, as indicated in dotted lines, from the supply reel 9 over a sprocket 17 against which it is held by suitable idle rollers 18, from which it passes in a loop around the casing through the guideway and back between other idlers 18 and the sprocket 17 to the take-up reel 8. The mechanism may be driven either by a crank 19 or through a spring belt 20 from a motor 21. A rotatable disc 22 on the motor shaft carries a pin 23 which may be made to move the resilient belt 20 out of driving engagement with the pulley 24. A lamphouse 25 projects light through a condenser 26 from which it is directed by a mirror (not shown) through a suitable window in the guide members.

The structure generally described above is not claimed in the present application, but is described as showing a useful application of my improved guideway. The member 12 is longitudinally channelled at 27, having on each side of the channel a smooth longitudinal extending projection or slideway 28 adapted to engage the borders of a film as the latter passes between the presser members. A corresponding channel 29 and marginal projections 30 are formed in the wall 11 in registry with the channel and projections of the member 12. There is formed in the member 11 a window 31 at a suitable point and slots 32 through which the claws pass. At one side of this member is a projecting flange 33 which engages the partition 2 and holds the member suitably positioned therefrom.

It has been usual heretofore in gates of this type, to have the presser members continuous to their ends which were somewhat recurved. It was thought that the film did not engage the bottom of the channel at the point of recurving and it was not realized that scratching could occur at such a point, particularly as the channel members are smooth. I have discovered, however, that by forming notches 34 and 35 at the ends of such a guide member, the notches extending beyond the points of reversed bending 36 and 37, the amount of scratching is surprisingly reduced. These notches extend between the recurved end portions 38 and the projections or slideways 28, and are formed in the channel part only. It is to be noted that these notches are formed only in a part where it was thought that the film did not contact. Apparently the film as it approaches the guideway in a loop 39 has a tendency to buckle as it enters the guideway, and to strike the transverse abutment heretofore present in the channel at the point of recurvature 36. Similar distortion, though apparently to a less extent, took place at the lower end of the guideway. The emulsion side of the film usually faces the member 12.

It is obvious that this invention is applicable to projectors of various types and to guideways of different forms. I contemplate as included in my invention, all such modifications and equivalents as fall within the scope of the appended claims.

Having thus described my invention, what I claim as new and desire to secure by Letters Patent is:

1. In a motion picture apparatus of the type in which film is fed from one side in a loop to a longitudinal guideway, an improved guideway comprising continuously curved facing guide members, the facing surface of one of which has a longitudinal channel and a smooth longitudinal projection on each side of the channel to engage the borders of the film, one end of the said member being curved backwardly away from the other member and said member being cut away between said projections at said end to a point beyond the point of backward curvature.

2. In a motion picture apparatus of the type in which a film band is fed from one side in a loop to a longitudinal guideway, an improved guideway comprising facing guide members between which film may be drawn, the facing surface of one of which has a longitudinal channel and a longitudinal smooth projection along each side thereof adapted to engage the borders of a film, both ends of the said members being curved backwardly away from the other member and said member being cut away between said projections at both ends to points beyond the points of backward curvature.

3. In a motion picture apparatus, two cooperating similarly curved guide members forming between them a guide for film, means toward which the guide is concave for feeding and directing film in a loop to said guide, that guide member which is farther from said means and the guiding surface of which is concave thereto having its ends reversely curved and having longitudinal smooth projections constituting film border engaging slides, and having a longitudinal channel therebetween, and the ends of said members being cut away between said projections to points beyond the points of reverse curvature.

4. In a motion picture apparatus of the type in which film is fed from one side in a loop to a longitudinal guideway, an improved guideway comprising facing, similarly curved guide members, between which film may be drawn, and having registering smooth projections extending longitudinally thereof with longitudinal registering channels therebetween, the projections being adapted to engage the opposite surfaces of the borders of a film strip, that member the facing surface of which is concave being reversely curved at its ends and being cut away centrally of the projections at its ends to points beyond the points of backward curvature.

5. In a motion picture apparatus, two cooperating, similarly curved guide members forming between them a guide for film, the facing surfaces of said members having smooth longitudinally extending projections forming a longitudinal channel between them, and adapted to engage and guide the opposite surfaces of the borders of a film, means toward which the guideway is concave for feeding and directing a strip of film in a loop to and from said guideway, that guide member which is farther from said means and the guiding surface of which is concave thereto having its projecting portions only extending at the ends and reversely curved, the central part between the borders being cut away at the ends to points beyond the points of reverse curvature.

Signed at Rochester, New York this 18th day of January, 1927.

OTTO WITTEL.